(12) United States Patent
King (10) Patent No.: US 9,625,180 B2
(45) Date of Patent: Apr. 18, 2017

(54) SOLAR PANEL INSTALLATION TOOL

(71) Applicant: Kevin King, Meridian, ID (US)

(72) Inventor: Kevin King, Meridian, ID (US)

(*) Notice: Subject to any disclaimer, the term of this patent is extended or adjusted under 35 U.S.C. 154(b) by 0 days.

(21) Appl. No.: 14/877,773

(22) Filed: Oct. 7, 2015

(65) Prior Publication Data

US 2016/0097565 A1 Apr. 7, 2016

Related U.S. Application Data

(60) Provisional application No. 62/060,908, filed on Oct. 7, 2014.

(51) Int. Cl.
*B25B 1/00* (2006.01)
*F24J 2/52* (2006.01)
*B25B 11/02* (2006.01)

(52) U.S. Cl.
CPC ............ *F24J 2/5203* (2013.01); *B25B 11/02* (2013.01); *F24J 2002/5273* (2013.01); *F24J 2002/5281* (2013.01); *Y02B 10/20* (2013.01); *Y02E 10/47* (2013.01)

(58) Field of Classification Search
CPC .... B25B 3/00; B25B 5/00; B25B 5/03; B25B 5/067; B25B 5/101; B25B 9/00
See application file for complete search history.

(56) References Cited

U.S. PATENT DOCUMENTS

| | | | | |
|---|---|---|---|---|
| 5,076,552 A | * | 12/1991 | Challis | B25B 5/068 269/203 |
| 5,174,553 A | * | 12/1992 | Challis | B25B 5/068 269/203 |
| 6,105,317 A | | 8/2000 | Tomiuchi et al. | |
| 6,360,491 B1 | | 3/2002 | Ullman | |
| 6,438,854 B1 | * | 8/2002 | Kott, Jr. | B25B 5/068 269/6 |
| 6,554,264 B1 | * | 4/2003 | Alford | B25B 1/103 269/147 |
| 6,959,517 B2 | | 11/2005 | Poddany et al. | |
| 7,909,314 B2 | * | 3/2011 | Roesch | B25B 5/068 269/166 |
| 8,052,100 B2 | | 11/2011 | Zante et al. | |
| 8,776,456 B1 | | 7/2014 | Schrock | |
| 8,813,460 B2 | | 8/2014 | Cinnamon et al. | |
| 2004/0140602 A1 | * | 7/2004 | Gerritsen | B25B 5/068 269/6 |

(Continued)

FOREIGN PATENT DOCUMENTS

| | | |
|---|---|---|
| EP | 2080234 A1 | 7/2009 |
| EP | 2333453 B1 | 8/2010 |

OTHER PUBLICATIONS

Chris Williams, Lessons Learned from Inventing a Solar Installation Tool and How it Can Help you Sell More Projects, Heatspring Magazine, Dec. 7, 2011; https:/blog.heatspring.com, accessed Nov. 17, 2015.

*Primary Examiner* — Lee D Wilson
(74) *Attorney, Agent, or Firm* — Robert L. Shaver; Shaver & Swanson, LLP (57) ABSTRACT

A solar panel installation tool, with coarse and fine position adjustment. The tool fits on a mounting rail installed on a roof, and supports the solar panel along its bottom side. A panel support bracket on the tool is adjusted to align the solar panel with the roof edge. The tool can be removed after the solar panel is bolted into place on the rack.

6 Claims, 7 Drawing Sheets

(56) References Cited

U.S. PATENT DOCUMENTS

| | | |
|---|---|---|
| 2013/0246010 A1 | 9/2013 | Dershowitz et al. |
| 2014/0082909 A1 | 3/2014 | Lu |
| 2014/0265084 A1* | 9/2014 | Evatt .................. B25B 5/068 269/6 |

* cited by examiner

SOLAR PANEL INSTALLATION TOOL

PRIORITY/CROSS-REFERENCE TO RELATED APPLICATIONS

This application claims the benefit of U.S. Provisional Application No. 62/060,908, filed Oct. 7, 2014 the disclosure of which is incorporated by reference.

TECHNICAL FIELD

The presently disclosed technology relates to a tool for use in mounting solar panels, and more specifically, a tool for mounting solar panels so that the bottom edges of solar panels align perfectly.

BACKGROUND

A common way to mount solar panels on a structure is by using mounting rails. The structure can be a steel frame which stands alone on posts, or the structure can be the roof of a building, the wall of a building, or the roof or walls of mobile structures such as RVs or vehicles. The example of solar panels which are mounted on the roof of a structure will be used for convenience, but is not meant to limit the claimed technology. Solar panels are typically rectangular and are mounted on mounting rails. The mounting rails are generally not perfectly parallel with the edge of the roof line. Some mounting rails have waves and curves and are not even close to being parallel with any straight line on the roof. Ideally, the rails would be perfectly parallel with a straight line of the roof, such as the bottom edge of the roof, the top edge of the roof, or the side of the roof. In reality, the rails are not perfectly parallel with the roof edge and they are not even parallel with each other.

The problem is when an array of rectangular solar panels is placed edge to edge on a roof; if they are not perfectly parallel with part of the roof, such as the lower edge of the roof, it is very obvious that they are not parallel, and the solar panel looks crooked.

The goal is to mount an array of solar panels so that all the bottom edges of the solar panels are aligned, or if they are not aligned, so that the bottom edge of the array of solar panels is parallel with the bottom edge of the roof or some other visible part of the roof.

What is needed is a tool which helps the installer of solar panels make the solar panel array parallel, in that the bottom edge of the solar panels can be controlled so that the entire array looks straight.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

Disclosed is a solar panel installation tool for positioning solar panels on mounting rails. The mounting rails can be on the roof of a residence or other building, or the mounting rails can be on a framework specifically for holding solar panels. The mounting rails can also be on other structures such as the walls of buildings, or various places on mobile structures such as motor homes or RVs. The tool includes a tool body, which is an elongate piece of material which is typically metal, but other materials such as plastic or wood would also work. In one version of the device, the tool is a single piece, with a single position adjuster. In other versions of the device the device body can be two pieces and a coarse and a fine position adjuster. The tool body has a first end and a second end, with a U-shaped bracket called a rail engaging foot attached to the second end. The tool has a top surface and a bottom surface and the U-shaped bracket defines an opening called a rail slot which is on the bottom side of the tool body, and in this sense, extends downward onto the rail to which the solar panel will be installed.

The first end of the tool body includes at least one position adjuster, which can take many different forms of adjustments which are known in the art. This can include cam locks, telescoping tubes, friction fit locks which hold the tubes apart, screw devices, or other position adjusting structures. The adjuster is attached to a panel support bracket, which is provided so that the edge of a solar panel can rest against the panel support bracket. The rail engaging foot with its rail slot is placed over the rail on a roof structure, the solar panel rests against the panel support bracket, and the adjuster moves back and forth to adjust the position of the bottom edge of the solar panel.

The panel support bracket is attached to the position adjuster, and adjustment of the adjuster moves the panel support bracket back and forth in relation to the rail slot on the rail engaging foot.

Another embodiment of the device includes the tool body being made of a first arm and a second arm which are attached to each other. Typically the first arm and the second arm have corresponding holes placed in each arm, which line up with holes in the other arm. By placing bolts in two or more of these holes, the length of the tool body can be extended to make it longer or shorter. This serves as a coarse adjustment feature. A screw type fine adjustment is available to make final small corrections in position of the solar panel.

The disclosed solar panel installation tool allows for adjustable layout of panels (landscape or portrait) and easily slides on and off a mounting rack with little effort, even after a solar panel has been installed. The solar panel installation tool can engage the mounting rack and does not require the tool to be physically screwed down. While engaged with the rack, it allows for adjustment of either corner of the solar panel in either direction. The rail engaging foot of the solar panel installation tool can be replaced with an alternative foot to accommodate any type of manufactured racking system, so the device is not limited to one type of racking system. The solar panel installation tool allows the solar panel to sit flush on racking while the solar panel is being tightened down. It is specially designed with shock absorption which allows for the dispersion of weight from the solar panel without disturbing the temporary mounting of the tool to the racking. The solar panel installation tool has the measurements for solar panel placement built into the tool, in the form of preset distances built into the coarse adjustment. It is designed for individual panel mounting, which proves useful in mounting arrays with customized layouts. The solar panel installation tool does not require screws to tighten to the racking which reduces the likelihood of the tool wearing out and needing to be replaced.

Another embodiment of the claimed technology is an adjusting tool in which the tool body is made up of two tubes which telescope together and apart. One tube is designated an outer tube and the other is designated an inner tube. The outer tube has a fine adjustment built into the first end, and provides an opening at the second end of the outer tube for the inner tube to be inserted. The inner tube has a first end and a second end and has a rail engaging foot at the second end, and at the first end attaches to the fine adjustment screw on the first end of the outer tube. The two tubes are connected to each other with a coarse adjustment feature. One way that these tubes can be adjusted with the coarse adjustment is that holes on the outer tube align with a spring loaded detent on the inner tube, and whichever setting is appropriate for a particular installation, the detent from the inner tube snaps into the hole in the outer tube and locks the inner and outer tube together temporarily. The holes can have a recessed shoulder which allows the user's thumb better access to pushing down on the detent button and releasing the detent.

The fine adjustment can be a knob located at the first end of the outer tube, and it is connected to the panel supporting bracket. The fine adjustment knob moves the panel supporting bracket back and forth, to make it closer or further away from the rail engaging foot.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF THE PREFERRED EMBODIMENTS

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Figure 1:
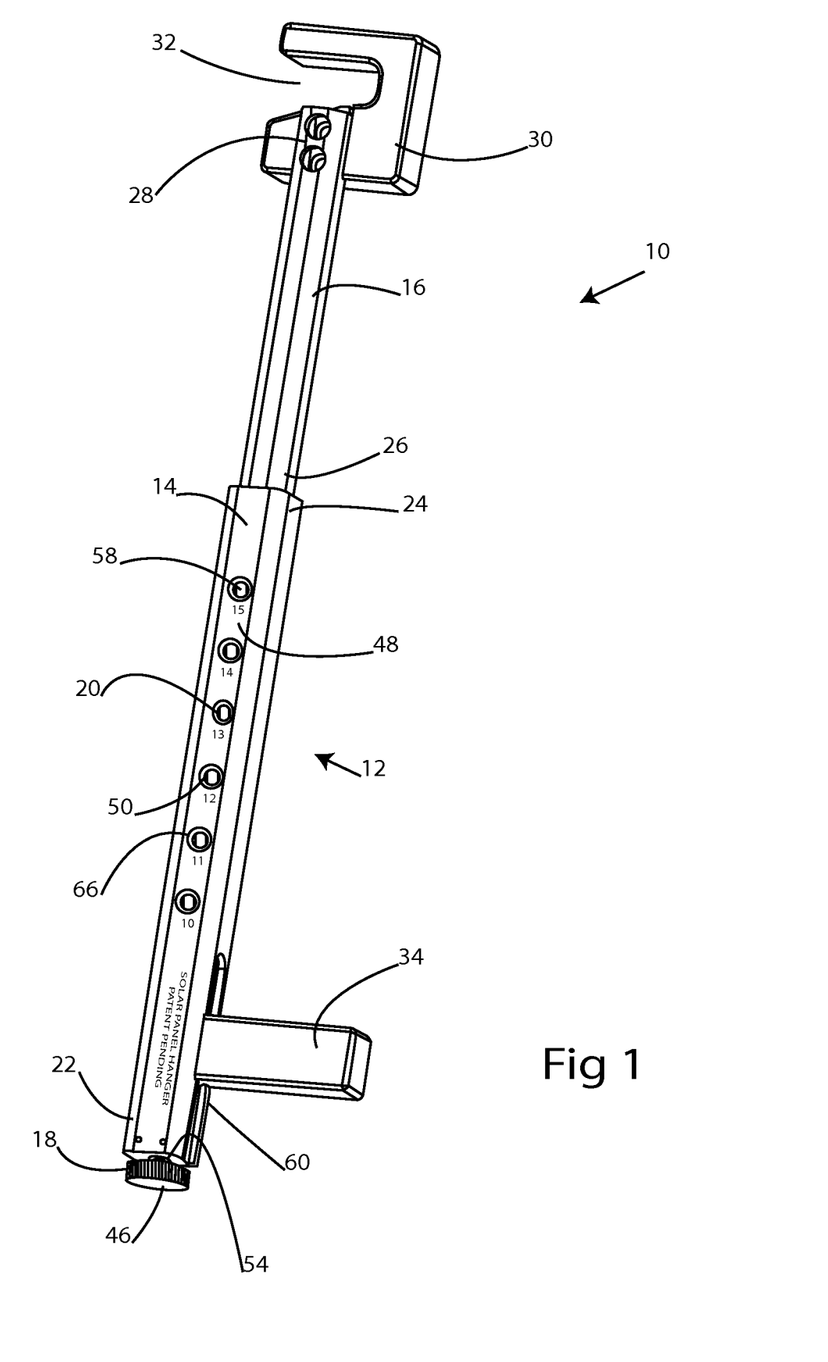
FIG. 1 is a perspective view of one embodiment of the solar panel installation tool.

Referring now to the figures, FIG. 1 shows one embodiment of the solar installation tool. The solar installation tool is referred to as 10 in the figures, and in the embodiment shown in FIG. 1 includes a tool body 12, outer tube 14, and inner tube 16. The inner tube telescopes out from the outer tube, and the installation tool 10 includes a coarse adjustment 20 in the form of holes in the outer tube of which one hole is engaged by a detent button located on the inner tube. In this way the inner tube may be extended out from the outer tube, to achieve a coarse adjustment of the length of the tube.

The installation tool 10 also includes a rail engaging foot 30, located on the second end of the inner tube 16. The outer tube has a first end 22 and a second end 24. The inner tube has a first end 26 and a second end 28. The rail engaging foot 30 is attached to the second end 28 of the inner tube. Attached to the first end 22 of the outer tube 14 is a panel support bracket 34. Attached to the panel support bracket 34 is a fine adjuster 18, which in this case is a screw which is attached to the panel support bracket 34 and causes that support bracket to move back and forth in relation to the rail engaging foot, by a finely controlled adjustment. In one embodiment the panel support bracket is moved by a jack screw, by turning an adjustment knob 46. The panel support bracket is held in a slot 60, and moves back and forth on a screw 54, by turning the adjustment knob 46. The embodiment of FIG. 1 can be different sizes for different sized solar panels, but in one embodiment the outer tube is 10.5 inches long, made of 1" square aluminum tubing. The inner tube can be 8.5 inches long, made of ¾" square aluminum tubing. The rail engaging foot can be ⅞" thick, and form a slot 1¾" deep and ¹¹⁄₁₆" wide at the top. The slot tapers according to the profile of the particular rail being use.

The coarse adjustment of the embodiment shown in FIG. 1 includes passages 50 defined in the outer tube 14, and a spring loaded post 58 on the inner tube 16 which engages one of the passages 50 to lock the tubes 14 and 16 together for a use on a particular rail. The passages 50 can include a recessed shoulder 66 to aid the user in depressing the post 58 with his thumb or finger.

Figure 2:
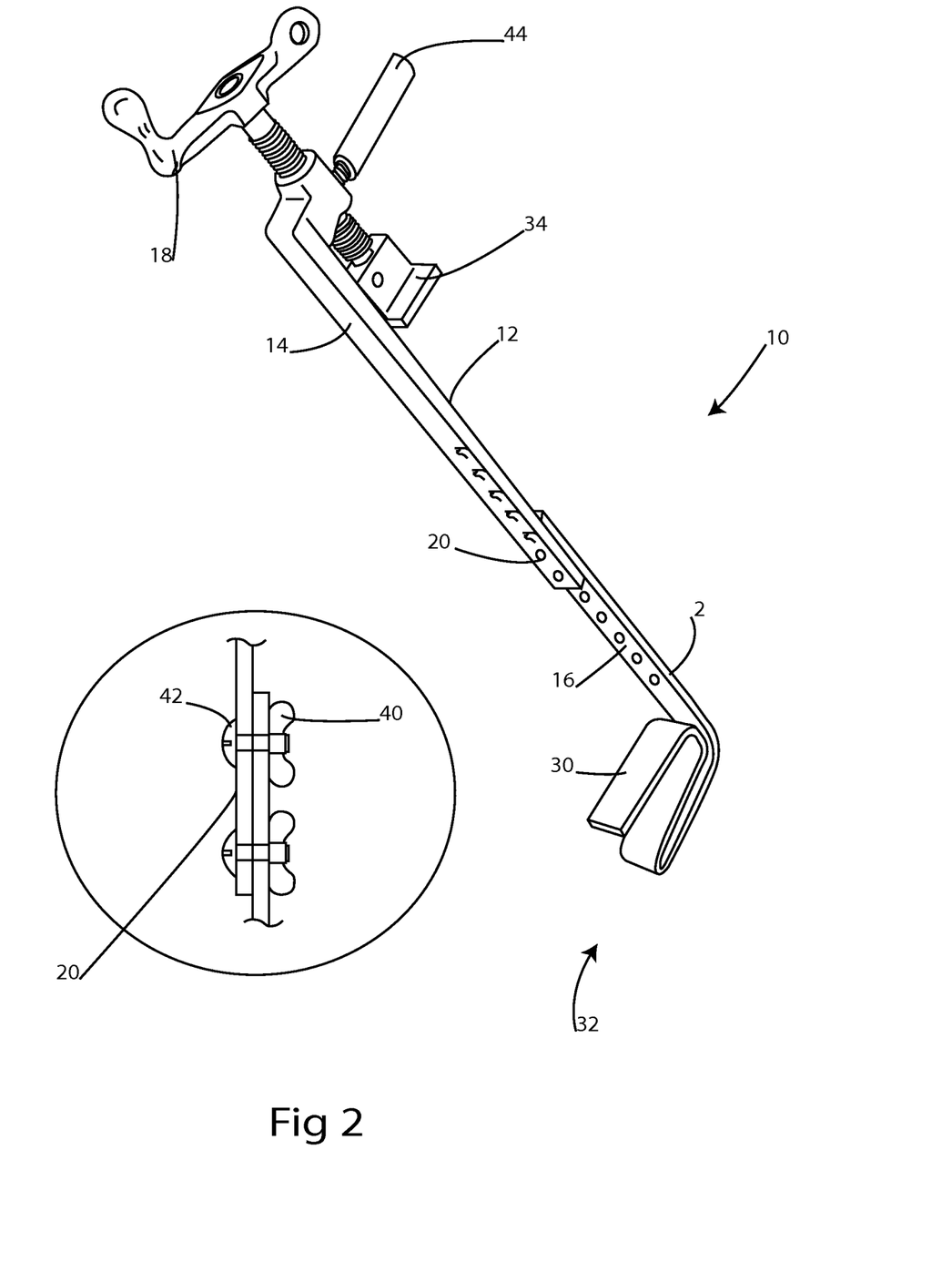
FIG. 2 is a perspective view of a different embodiment of the solar panel installation tool.

FIG. 2 shows a different embodiment of the device, in which the tool body 12 is made up of a first arm 14 which is equivalent to the outer tube shown as 14 in FIG. 1. It also includes a second arm 16 which is equivalent to the inner tube 16 shown in FIG. 1. A coarse adjuster 20 is present in the form of holes in the two arms which can be connected to each other at different points such as by the bolts 42 and wing nuts 40 shown in FIG. 2. The embodiment shown in FIG. 2 includes a rail engaging foot 30 which includes a rail slot 32 which is generally U shaped. The device includes a fine adjuster 18 which in this case is a screw with a crank which is attached to the rail engaging foot 30 and moves the rail engaging foot 30 back and forth in relation to the panel support bracket 34. FIG. 2 shows an alternative feature which may be present in any of the embodiments, which is a handle 44 which may be used to turn the device during the installation process of fitting the rail engaging foot 30 onto a rail.

Figure 3:
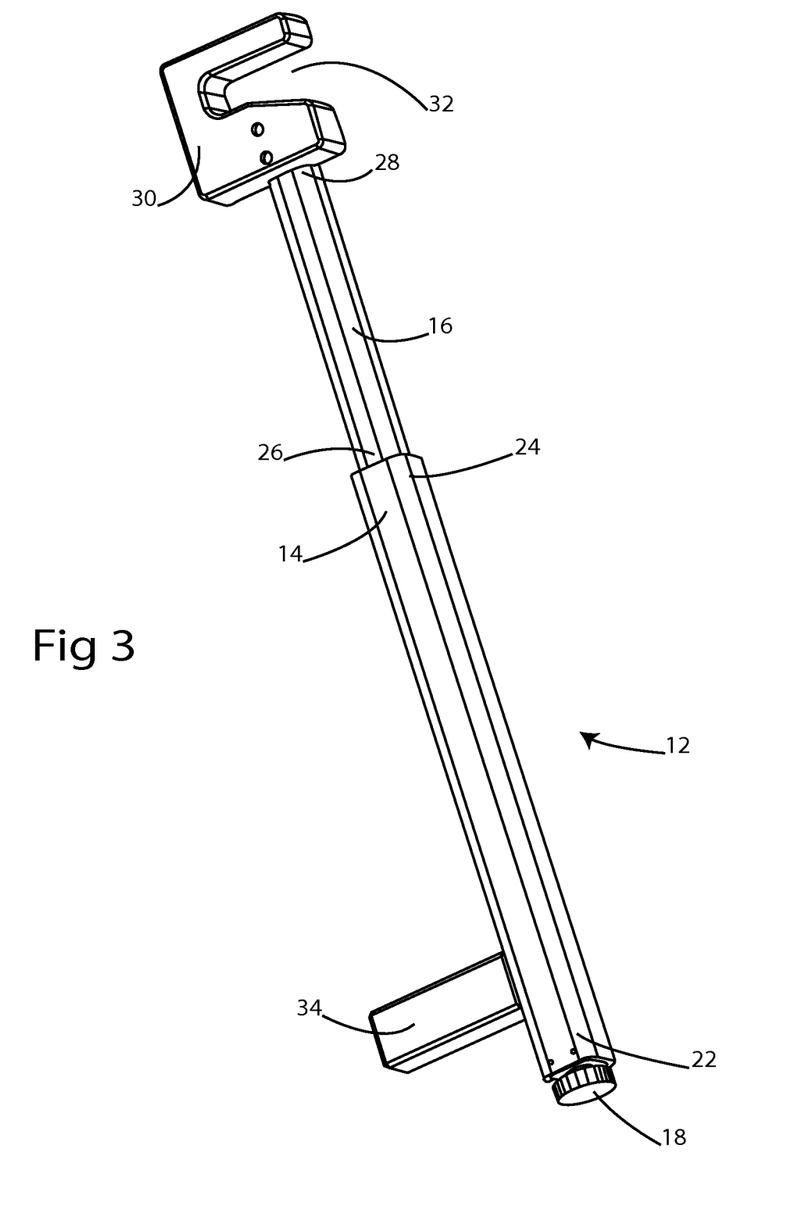
FIG. 3 is a perspective view of the reverse side of the embodiment shown in FIG. 1 of the solar panel installation tool.

FIG. 3 shows the same embodiment as shown in FIG. 1, but shows the reverse side of the device.

Figure 4:
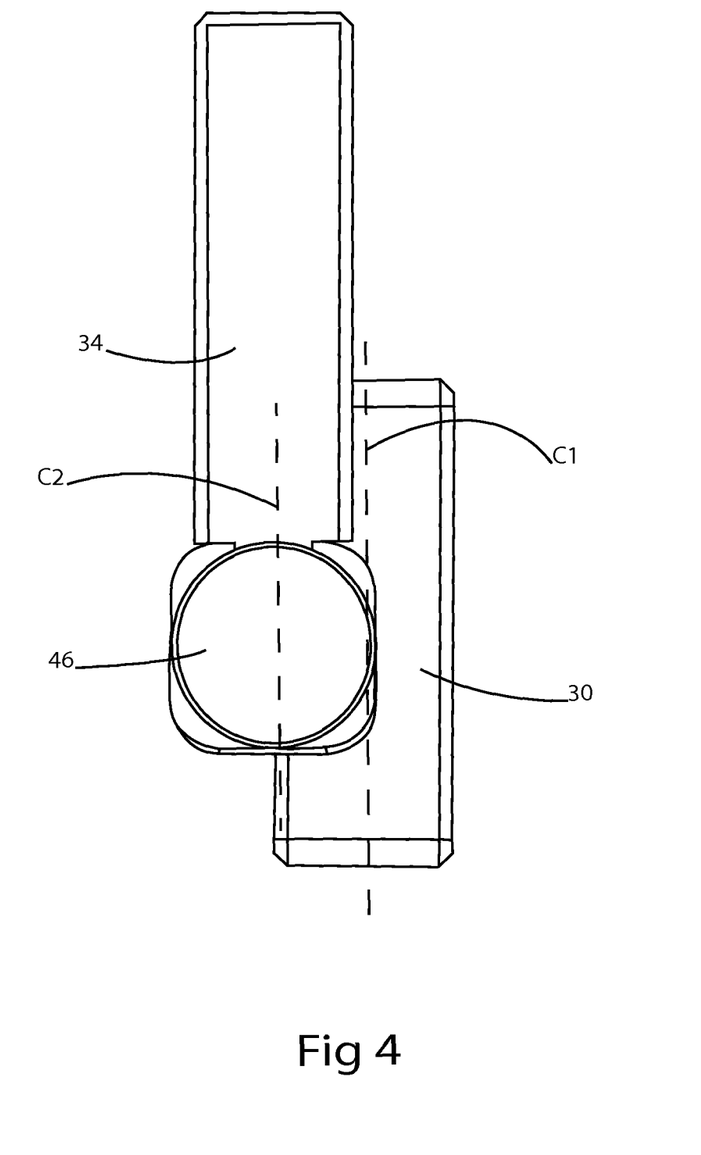
FIG. 4 is an end view of the tool, showing the fine adjustment knob.

FIG. 4 shows the first end of the device, including the fine adjuster knob 46, the back rear side of the panel support bracket 34 and the back side of the rail engaging foot 30. This shows that the center line C1 of the rail engaging foot 30 is not coplanar with the center line C2 of the tool body. It is offset, which allows it to fit between the rail and the solar panel, and then be turned, which will be shown in other figures.

Figure 5:
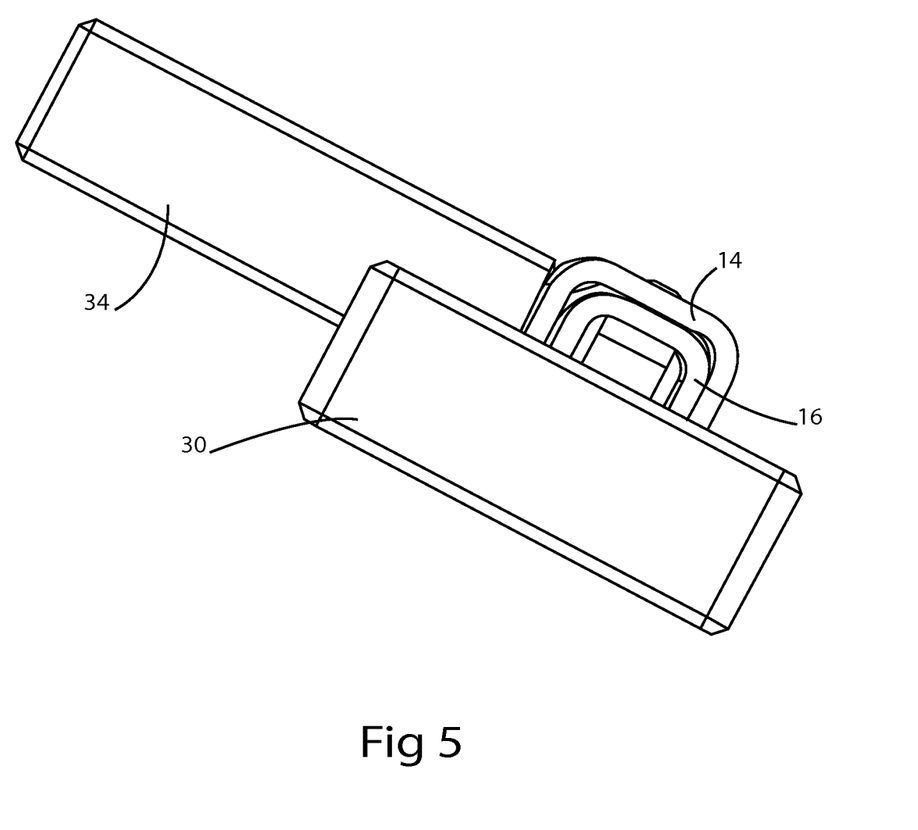
FIG. 5 is an end view of the tool, showing the rail engaging foot.

FIG. 5 shows a view of the second end of the tool body, showing the rail engaging foot 30, the outer tube 14 and the inner tube 16, and the panel support bracket 34. Again, the centerline of the rail engaging foot 30 is shown as being not coplanar with the centerline of the panel support bracket 34 and the outer tube 14. The purpose of that will be discussed below.

Figure 6:
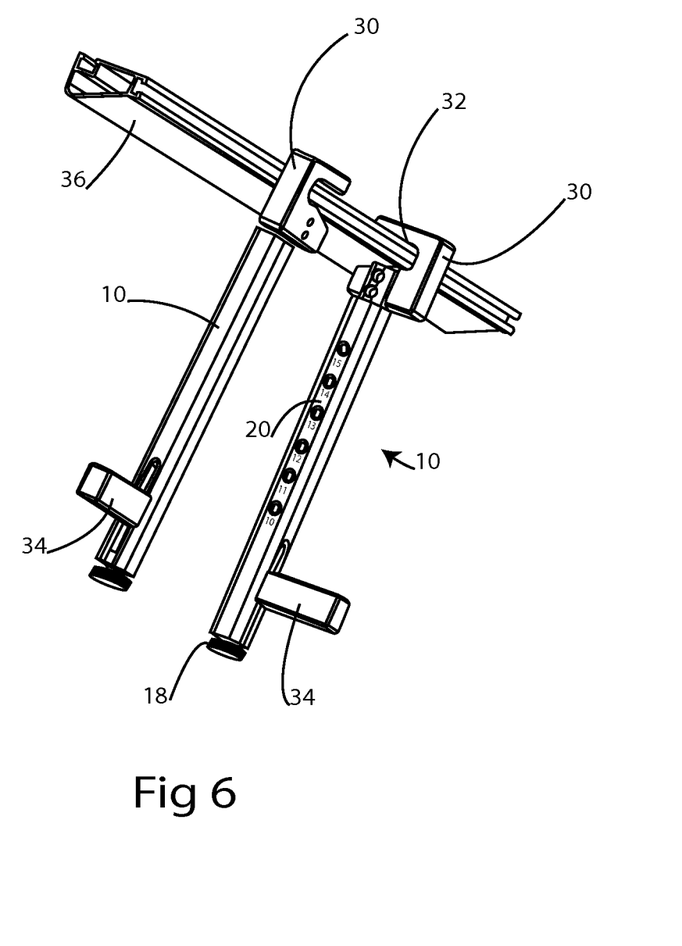
FIG. 6 is a perspective view showing two tools engaging a mounting rail.

Shown in FIG. 6 are two solar installation tools 10, which show how the units are mounted onto a rail 36. The rails 36 would typically be mounted to a structure, which can be the top of a roof, or a side of a wall, or in a free standing frame. The solar panel would be placed on a rail, and the solar panel is not shown in FIG. 6. There is a gap between the bottom of the solar panel and the top of the rail, due to the solar panel having a frame which keeps the underside of the solar panel spaced apart from the top of the rail. The rail engaging foot 30 of the device is placed in a flat position between the underside of the solar panel and the top of the rail, and moved until the rail slot 32 is positioned over the top of the rail 36. The tool 10 is then rotated as shown into position of the upper tool, so that the rail slot 32 fits down over the top of the rail 36. In this configuration the bottom of the solar panel would be resting on the panel support bracket 34. The fine adjuster 18 or the coarse adjuster 20 would be moved until the panel is in the right relationship to the rail and the edge of the roof. As other panels are attacked to the rail, the same tools 10 would be used to move each panel individually until it aligned perfectly with the first one. The tools are rotated and removed once the solar panels are bolted down.

Figure 7:
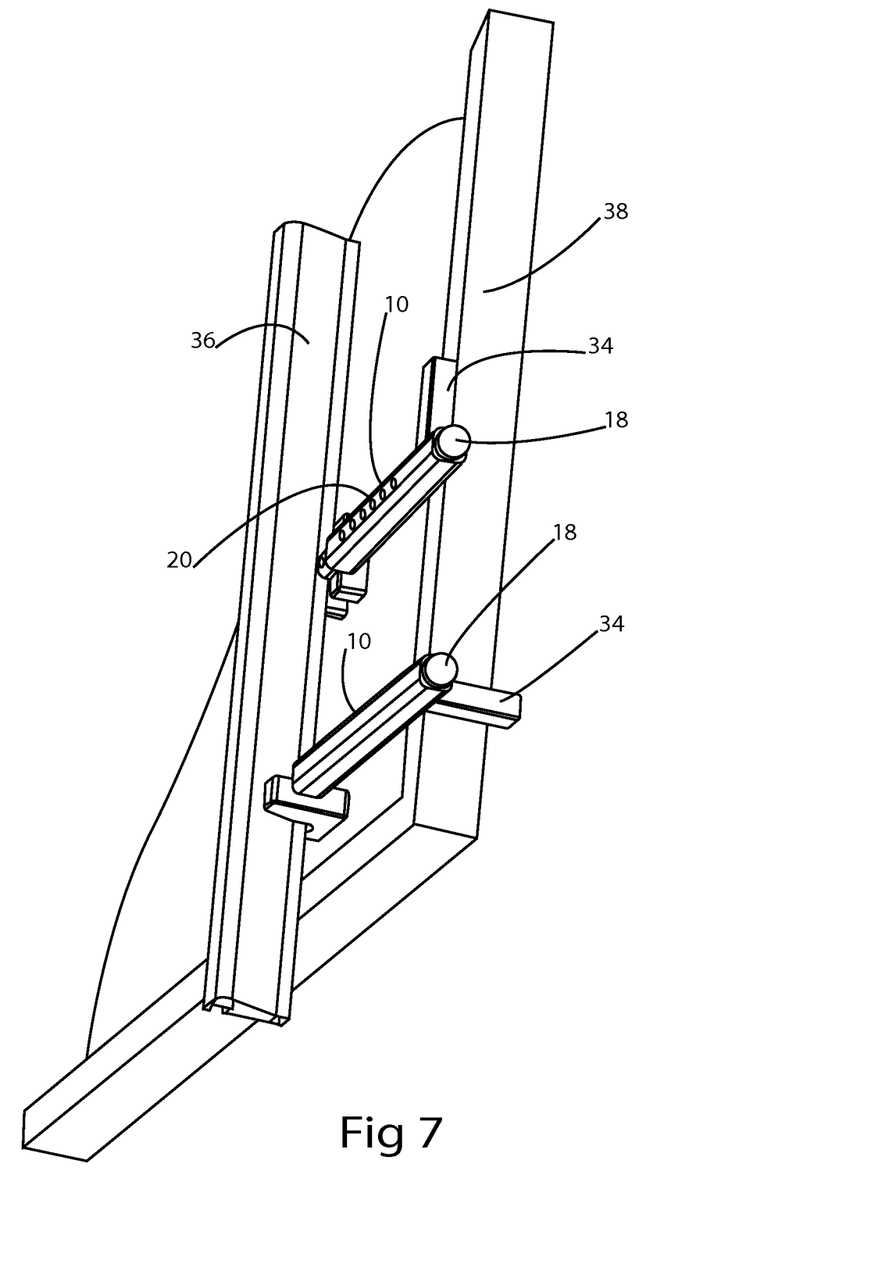
FIG. 7 is a perspective view showing two tools ready to engage the rail, and engaging the rail.

FIG. 7 shows the underside of the solar panel 38 showing the rail 36, with the same two installation tools 10 preparing to engage or engaging the top of the rail 36. Shown is the panel support bracket 34 and in both tools the fine adjuster 18 is shown, and the coarse adjuster 20 is shown on the left hand tool.

In use, the first solar panel 38 would be roughly positioned over the pre-installed rails 36, and aligned using the coarse and fine adjuster so the bottom edge of the solar panel is parallel with a feature on the roof, such as the bottom edge of the roof. Once the first solar panel is installed, the other solar panels are installed so that their bottom edges form a straight line, which is parallel with the feature on the roof such as the bottom edge of the roof, and parallel with the bottom edge of the first solar panel installed. Once a solar panel is positioned and bolted down, the installation tool can be rotated, and removed from the rail.

An option is to have a centering light such as a laser on the second end of the tool. A laser would be emitted from one tool to another, to verify that the panels are perfectly aligned. In this way a tool mounted on the first panel in a row could be used to align all the other panels in that row, using the laser on the first tool as a sight gauge to align subsequent tools and the panels they support.

An additional feature is calibration or increment markings 48 on the side of the tool. The marking can be at each coarse adjustment position, to indicate inches to the center of the rail. These are markings like 15, 16, etc. Additional increments are also possible, such as rule marks with 1/16 inch increments.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

I claim:

1. A solar panel installation tool, for positioning solar panels on mounting rails attached to a roof surface, comprising:
   a tool body, with a first end and a second end, a top side and a bottom side, with a rail engaging foot on said second end, with said rail engaging foot defining a rail slot facing away from said bottom side;
   a panel support bracket attached to the first end of said tool body, said panel support bracket attached to and responsive to a position adjuster, and extending from said tool body in an opposite direction from said rail slot;
   one or more increment markings on said tool body; wherein
   said position adjuster is configured to move said panel support bracket in relation to said rail engaging foot, with said rail engaging foot configured for placing said rail slot on a mounting rail attached to a roof, and with said panel support bracket configured to support and position a solar panel at a distance from said rail engaging slot determined by said position adjuster.

2. A solar panel installation tool, for positioning solar panels on mounting rails attached to a roof surface, comprising:
   a tool body, comprised of an outer tube substantially surrounding an inner tube, with said outer tube having a first end and a second end, with a fine adjuster on said first end of said outer tube, and further comprising a coarse adjuster, with said outer tube attached to said inner tube;
   said inner tube having a first end and a second end, said inner tube second end attached to a rail engaging foot, with said rail engaging foot defining a rail slot facing downward;
   said tool body further comprising a panel support bracket on said first end of said outer tube, said panel bracket attached to and responsive to said fine adjuster, and extending from said tool body in an opposite direction from said rail slot;
   said fine adjuster turnable to move said panel bracket toward or away from said second end of said outer tube; and
   said coarse adjuster configured to extend and lock said inner tube from said outer tube;
   wherein said rail engaging foot is configured for placing said rail slot on a mounting rail attached to a roof, and with said panel support bracket is configured to support and position a solar panel at a distance from said rail determined by said coarse adjuster and said fine adjuster.

3. The solar panel installation tool of claim 2 which further comprises increment markings on said tool body.

4. The solar panel installation tool of claim 2 in which said coarse adjustment is comprised of passages in said outer tube, and a spring loaded post in said inner tube which serves as a detent in said passages.

5. The solar panel installation tool of claim 4 in which said passages further comprise a recessed shoulder to aid in depressing said post.

6. The solar panel installation tool of claim 2 in which said fine adjustment is a screw attached to an adjustment knob, with said screw passing through said panel support bracket, and with panel support bracket enclosed in a slot on said outer tube.

* * * * *